United States Patent [19]

Krause et al.

[11] Patent Number: 5,498,582
[45] Date of Patent: Mar. 12, 1996

[54] SUPPORTED METALLOCENE CATALYSTS FOR THE PRODUCTION OF POLYOLEFINS

[75] Inventors: Michael J. Krause, Milltown; Frederick Y. Lo, Edison, both of N.J.; Steven M. Chranowski, Friendswood, Tex.

[73] Assignee: Mobil Oil Corporation, Fairfax, Va.

[21] Appl. No.: 161,849

[22] Filed: Dec. 6, 1993

[51] Int. Cl.$^6$ .............................. B01J 31/14; B01J 37/02
[52] U.S. Cl. ...................... 502/103; 502/117; 502/118; 502/150
[58] Field of Search .................. 502/117, 103, 502/118, 150

[56] References Cited

U.S. PATENT DOCUMENTS

| | | | |
|---|---|---|---|
| 5,001,244 | 3/1991 | Wellborn, Jr. | 556/53 |
| 5,118,648 | 7/1992 | Fwetek et al. | 502/116 |
| 5,153,157 | 10/1992 | Hlatky et al. | 502/117 |
| 5,155,080 | 10/1992 | Elder et al. | 502/152 |
| 5,198,401 | 3/1993 | Turner et al. | 502/155 |
| 5,225,500 | 7/1993 | Elder et al. | 526/127 |
| 5,241,025 | 8/1993 | Hlatky et al. | 526/129 |
| 5,278,119 | 1/1994 | Turner et al. | 502/155 |
| 5,397,757 | 3/1995 | Mink et al. | 502/115 |

FOREIGN PATENT DOCUMENTS

| | | |
|---|---|---|
| 0426637 | 8/1991 | European Pat. Off. . |
| 9109882 | 7/1991 | WIPO . |
| WO91/09882 | 7/1991 | WIPO . |

OTHER PUBLICATIONS

Chien, James C. W., Isospecific Polymerization of Propylene Catalyzed by rac-Ethylenebis(indenyl)methylzirconium "Cation", *J. Am. Chem.*, 8570–8571, 1991.
Hlatky, Gregory G., "Ionic, Base-Free Zirconocene Catalysts for Ethylene Polymerization", J. Am. Chem. Soc., 2728–2729, (1989).

*Primary Examiner*—E. Rollins Cross
*Assistant Examiner*—Timothy H. Meeks
*Attorney, Agent, or Firm*—Alexander J. McKillop; Malcolm D. Keen; Marina V. Schneller

[57] ABSTRACT

A catalyst precursor is formed by providing in slurry: (1) a carrier, which is porous and in the form of particles, or spheres, preferably particles of a crosslinked polymer, having a particle diameter of about 1 to about 300 microns, a porosity of about 0.001 to about 10 cc/gm, and a surface area of about 1 to about 1,000 m$^2$/gm; (2) a metallocene complex having an empirical formula $$Cp_mMA_nB_p$$

in which Cp is an unsubstituted or substituted cyclopentadienyl group, M is zirconium, titanium, or hafnium; m is 1, 2, or 3 and each of A and B is a halogen atom, hydrogen or an alkyl group, and (3) an anion forming reagent comprising either a borate complex or a borane. An alkyl aluminum compound is used in conjunction with the catalyst as either a cocatalyst or an impurity scavenger.

40 Claims, No Drawings

SUPPORTED METALLOCENE CATALYSTS FOR THE PRODUCTION OF POLYOLEFINS

FIELD OF THE INVENTION

The invention relates to catalytic olefin polymerization and copolymerization. It relates to the production of high molecular weight olefin polymers containing more than 60 percent of ethylene units. It relates to the catalytic production of high molecular weight olefin polymers containing ethylene units, of very narrow molecular weight distribution.

Further, the invention relates to a high activity catalyst and to olefin resin production characterized by high productivity. The catalyst comprises a supported metallocene catalyst which does not require activation with aluminoxane.

BACKGROUND OF THE INVENTION

Low pressure or linear polyethylene is produced commercially using either Ziegler-Natta or supported chromium catalysts. These catalysts have high activities, and produce a variety of homopolymers and copolymers of ethylene and alpha olefins. When making copolymers, these catalysts typically produce resins of moderately broad to very broad molecular weight distribution, as characterized by their MFR value ($I_{21}/I_2$) of greater than 22.

Ziegler-Natta and supported chromium catalysts produce copolymers of ethylene and alpha olefins of non-uniform branching distribution. The alpha olefins are preferentially incorporated into the lower molecular weight portions of the copolymer. This non-uniform incorporation affects polymer properties. At a given polymer density, higher comonomer percent incorporation is required and a higher polymer melting point is seen. For example, ethylene/1-hexene copolymers of 1.0 $I_2$ and 0.918 gm/cc density produced by a typical Ziegler-Natta catalyst will contain 3.0 to 3.5 mole percent 1-hexene and have melting points of 126° to 127° C.

Recently, a new type of olefin polymerization catalyst has been described. These catalysts are metallocene derivatives of transition metals, typically group IV transition metals such as zirconium, of the empirical formula $Cp_mMA_nB_p$. These compounds are activated with methylaluminoxane (MAO) and produce olefin polymers and copolymers, such as ethylene and propylene homopolymers, and ethylene/butene and ethylene/hexene copolymers. These are described in Kaminsky et al, U.S. Pat. No. 4,542,199 and Sinn et al, U.S. Pat. No. 4,404,344; the entire contents of both are incorporated herein by reference.

Unlike earlier Ziegler-Natta catalysts, zirconocene/MAO catalysts produce polyethylene resins of narrow molecular weight distribution (MFR of 15 to 25) and a highly homogeneous branching distribution. Ethylene/1-hexene copolymers of 1.0 $I_2$ and 0.918 gm/cc density produced by these catalysts usually contain 2.5 mole percent 1-hexene and have melting points of 114° to 115° C. These resins can be used to make films of significantly higher impact strength and better clarity than those of resins prepared with standard Ziegler-Natta catalysts.

It is currently believed that the function of MAO in these systems is to alkylate the metallocene compound and then form a transition metal complex cation by disproportionation of an alkyl group. This then leaves MAO as a complex anion. By specific example, $Cp_2ZrCl_2$ reacts with MAO $[(MeAlO)_n]$ to form the catalytically active $Cp_2ZrMe^+$ cation and a poorly understood $[(MeAlO)_{n-1}(Cl_2AlO)]^-$ anion.

A new series of reactions have been described in which dialkylzirconocenes ($Cp_2ZrRR'$ where R and R' are straight chain hydrocarbon groups) are activated without aluminoxane to produce a catalytically active transition metal cation. Jordan et al, *J. Amer Chem Soc.* 1987, 109, 4111 has reacted $Cp_2ZrMe_2$ with $(Cp_2Fe)^+B(C_6H_5)_4^-$ in $CH_3CN$ to produce $Cp_2ZrMe(CH_3CN)^+B(C_6H_5)_4^-$. This ionic complex has rather poor activity for olefin polymerization due to the coordinated solvent molecule.

Common anions, such as $B(C_6H_5)_4^-$, react with the zirconocene cation in the absence of a coordinating solvent. These reactions produce catalysts that have relatively low polymerization activity.

Stable, solvent-free, zirconocene cations have been produced by Chien et al, *J. Amer. Chem. Soc.* 1991, 113, 8570. Reacting $Cp_2ZrMe_2$ with $Ph_3C^+B(C_6F_5)_4^-$ in a non-coordinating solvent produces $Cp_2ZrMe^+B(C_6F_5)_4^-$. Likewise, Marks et al, *J. Amer. Chem. Soc.* 1991, 113, 3623, react $Cp^*_2ThMe_2$ with $B(C_6F_5)_3$ in a non-coordinating solvent to produce $Cp^*_2ThMe^+MeB(C_6F_5)_3^-$. These ionic complexes are highly active olefin polymerization catalysts. These catalysts are only used in slurry or solution phase processes.

There are no reports of these catalysts supported on a carrier. When supported, these catalysts might be expected to be inert due to close ion-pairing in the solid state, or by reaction with the support. If not inert, the catalysts might still be undesirable if support interactions affect polymer structure and comonomer incorporation.

SUMMARY OF THE INVENTION

It is found, however, that supported catalysts are highly active for olefin polymerization. These catalysts are used in conjunction with a cocatalyst or a scavenger to produce polymer with desirable properties.

The catalyst precursor is formed by providing in slurry: (1) a carrier, which is porous and in the form of particles, or spheres, preferably particles of a crosslinked polymer, having a particle diameter of about 1 to about 300 microns, a porosity of about 0.001 to about 10 cc/gm, and a surface area of about 1 to about 1,000 m²/gm; (2) a metallocene complex having an empirical formula

$Cp_mMA_nB_p$ in which Cp is an unsubstituted or substituted cyclopentadienyl group, M is zirconium, titanium, or hafnium; m is 1, 2, or 3 and each of A and B is a halogen atom, hydrogen or an alkyl group, and (3) an anion forming reagent comprising either a borate complex or a borane. An alkyl aluminum compound is used in conjunction with the catalyst as either a cocatalyst or an impurity scavenger.

In a specific embodiment, this is accomplished by (1) providing a carrier in slurry, which is porous and in the form of particles, or spheres, preferably particles of a crosslinked polymer or silica, having a particle diameter of about 1 to about 300 microns, a porosity of about 0.001 to about 10 cc/gm, and a surface area of about 1 to about 1,000 m²/gm, (2) providing a solution comprising a borane complex; and (3) thereafter adding bis(indenyl)zirconium dimethyl, wherein the molar ratio of the bis(indenyl)zirconium dimethyl to borane complex is 1:1. Solvent is removed to recover a dry impregnated carrier which is used in the presence of triisobutyl aluminum scavenger.

The invention includes the foregoing process, the product(s) thereof, the catalysts formed therefrom, and the polymerizations and copolymerizations achieved thereby.

DETAILED DESCRIPTION OF THE INVENTION

In one embodiment, the catalyst of the invention exhibits high activity for homopolymerization and copolymerization of ethylene and higher alpha-olefins and allows the synthesis of ethylene polymers and copolymers with narrow molecular weight distribution and homogeneous branching distribution. LLDPE resins produced with zirconocene catalysts have superior properties. These resins can be used to make films with significantly better clarity and impact strength. Extractables of such resins are lower and the balance of properties in the films between the machine and transverse directions is excellent.

Catalyst Composition & Preparation

Catalyst precursor preparation comprises impregnating the metallocene and activator onto a carrier and activating the precursor with a trialkylaluminum cocatalyst. In one embodiment, the support of this invention is a polymeric material that is utilized in the form of distinct, pre-formed spherical, porous particles to support catalytically-active ingredients. In this respect, the use of these particles as a catalyst support is distinct from the use of polymeric materials as supports in prior art for olefin polymerization catalyst compositions. Polymeric materials used in prior art were utilized in the form of at least partially softened polymer resins having catalytically active ingredients mixed into the resins to form a substantially homogeneous mass which was subsequently pelletized or extruded into catalyst particles.

The support particles have spherical shape with the particle diameter of about 1 to about 300 microns, preferably about 10 to about 150 microns and most preferably about 50 to about 110 microns. The particles are preferably chemically inert with respect to water, oxygen, organic solvents, organometallic compounds and halides of transition metals and have the characteristics of a free flowing powder. Polymeric supports are preferably crosslinked by any conventional means, such as by cross linking agents, e.g., divinylbenzene, para-vinylstyrene, para-methylstyrene and trimethylacrylate under conventional crosslinking conditions, or by electromagnetic radiation in a conventional manner, e.g., see KIRK-OTHMER ENCYCLOPEDIA OF CHEMICAL TECHNOLOGY, Third Edition, Volume 19, pages 607–624, John Wiley & Sons, New York (1982). The polymer particles must have the porosity of about 0.001 to about 10 cc/gm, a surface area of about 1 to about 1,000 m$^2$/gm and calculated average pore diameter as set forth below.

The average pore diameter, PD in Angstroms, is calculated from the measured values of pore volume and surface area from the following equation, $$PD=(PV/SA) \times 40{,}000$$

where PV is pore volume, in cc/gm, and SA is surface area, in m$^2$/gm.

Surface area is measured by the well known BET liquid nitrogen absorption technique, while pore volume is measured by determining the amount of nitrogen (N$_2$) absorbed by the pores of a sample at such pressure and temperature conditions that the nitrogen condenses as a liquid into the pores. The porous support particle must have the average calculated pore diameter of at least about 10, preferably at least about 20 and most preferably at least about 50 Angstroms (Å). The polymer particles may have any combination of pore volume and surface area which would assure that the particles have the aforementioned average calculated pore diameter. For purposes of exemplification, the particles may have pore volume of at least about 0.001 cc/gm, preferably at least about 0.01 cc/gm and most preferably at least about 0.1 cc/gm, and the surface area of at least about 4 m$^2$/gm, preferably at least about 20 m$^2$/gm and most preferably at least about 80 m$^2$/gm, respectively. The polymer particles may be manufactured from silica, alumina, aluminum phosphate, or any suitable polymers, including thermoplastic, thermoset, semicrystalline, amorphous, linear, branched or cross-linked polymers, so long as the porous polymer particles have the above-specified porosity, surface area and pore diameter characteristics.

Examples of suitable polymer used to manufacture the porous particles are polyethylene, polystyrene, poly(vinyl alcohol), poly(methyl methacrylate), or poly(methyl acrylate). The most preferred polymer particles are divinylbenzene-cross-linked polystyrene particles available from Advanced Polymer Systems, Redwood City, Calif.

The use of the polymer particles as the support for the catalyst of the invention provides several advantages over similar olefin polymerization catalyst compositions prepared with refractory oxide supports, such as particulate silica supports. Some catalysts of the invention exhibit much greater activity, and productivity, than their silica substituted counterpart, as shown below. The polymer particles require no dehydration prior to the use thereof in the catalyst synthesis, thereby expediting the synthesis process and reducing the overall cost thereof. However, if desired, they can be dehydrated prior to catalyst synthesis.

Although the polymer particles can be used as a support in the synthesis of any olefin polymers, such as aromatic or linear olefins, e.g., styrene or ethylene, they are preferably used as supports in the synthesis of alpha-olefin polymerization catalysts. Accordingly, for the purposes of illustration and exemplification, the invention will be described below in conjunction with alpha olefin catalyst synthesis. However, it will be understood by those skilled in the art that the invention is not limited to alpha-olefin polymerization catalyst compositions.

The polymer particles are utilized as a support in the catalyst synthesis in a convenient manner in which particulate supports of prior art were used to synthesize supported alpha-olefin polymerization catalyst compositions. Thus, for example, the particles can be added to a synthesis vessel, to which is thereafter added a suitable solvent used heretofore for the catalyst synthesis. Subsequently, suitable components are added to the synthesis vessel. The solvents used in the synthesis are aromatic or non-aromatic hydrocarbons, e.g., hexane, isobutane, or toluene.

In one embodiment of the invention the carrier is slurried with a solution of a trityl- tetraaryl borate. The result of this stage is to provide a supported trityl tetraarylborate complex. The amount of the complex is sufficient to provide a loading of 0.01 to 2.0 mmol/g, preferably 0.05 to 1.50 mmol/g on the carrier.

The trityl-tetraaryl borate is formed by reacting a trityl derivative with a tetraarylborate anion, in salt form. This reaction is undertaken under inert conditons, in the absence of water and in the absence of oxygen. Preferably, the trityl derivative [$(C_6X_5)C^+$] is a halide, most preferably chloride. In an embodiment below, the tetraarylborate anion is formed by reacting an aryl derivative with BCl$_3$ at extremely low temperatures, ranging from –100° to –50° C., preferably –70° to –80° C. The aryl may be unsubstituted or substituted phenyl; in a preferred embodiment below, it is perfluorophenyl. The amount of the aryl lithium reagent is to provide a molar ratio of aryl derivative:BCl$_3$ of 4:1. The reaction produces an orange solution, containing fine solids. The fine solids are filtered from the orange solution; and the solution, which contains the trityl-tetraaryl borate derivative, is used to slurry the carrier, and impregnate the pores thereof.

In the preferred embodiment of the invention, the carrier is slurried with a triaryl borane, preferably $B(C_6F_5)_3$. The amount of the complex is sufficient to provide a loading of 0.01 to 2.0 mmol/gm support, preferably 0.05 to 1.0 mmol/gm support.

The supported tetraarylborate trityl or triarylboron complex is treated with a transition metal compound preferably a salt, preferably of a metallocene compound. The metallocene salt is provided in an amount to provide a molar ratio of transition metal:tetraarylborate ranging from 1:1 to 1:4, preferably 1:1.

The metallocene salt or compound has the formula $Cp_m\text{-}MA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. Preferably, m is 2 but it may be 1 or 2. In the above formula of the metallocene compound, the Cp group is an unsubstituted, a mono- or a — polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen, —$Si(CH_3)_2$—, $Si(CH_3)_2$—$CH_2$—$CH_2$—$Si(CH_3)_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)hafnium dimethyl, bis(n-butylcyclopentadienyl)zirconium dichloride, bis(n-butylcyclopentadienyl)zirconium dimethyl, cyclopentadienylzirconium trichloride, bis(indenyl)zirconium dichloride, bis(indenyl)zirconium dimethyl, bis(4,5,6,7-tetrahydro-1-indenyl)zirconium dichloride, bis(4,5,6,7-tetrahydro-1-indenyl)zirconium dimethyl, ethylene-[bis(4,5,6,7-tetrahydro-1-indenyl)] zirconium dichloride and ethylene [bis(4,5,6,7-tetrahydro-1-indenyl)] zirconium dimethyl. The metallocene compounds utilized within the embodiment of this art can be used as crystalline solids or as solutions in aliphatic or aromatic hydrocarbons. After the reaction is complete, solvent is removed at reduced pressure or by inert gas purge at temperatures of 50°–80° C. A yellow free-flowing powder is recovered.

When the metallocene is a dichloride derivative, preferably bis(indenyl) zirconium dichloride, the free flowing powder is a catalyst precursor which is activated with a trialkyl aluminum cocatalyst or activator to form a catalyst composition free of aluminoxane. When the metallocene is a dimethyl derivative, preferably bis(indenyl) zirconium dimethyl, it is not necessary to activate the free flowing powder with trialkyl aluminum. Trialkyl aluminum is used in conjunction with these catalysts, however, to remove impurities from the reactor system. Dialkyl zirconocene derivatives are the most preferred metallocene derivatives because these produce the highest productivity catalysts.

The catalysts of the invention use a cocatalyst or scavenger comprising an aluminum alkyl compound, such as a trialkyl aluminum, in which each alkyl contains 1 to 8 carbon atoms, free of alumoxane, and a catalyst precursor comprising metallocene and trityl aryl borate supported on a porous organic carrier. Catalysts of the invention have an activity of at least about 800 g polymer/g catalyst or about 300 kg polymer/g transition metal. Preferably the trialkyl aluminum is triisobutyl aluminum.

In one embodiment, the catalyst of the invention exhibits high activity for polymerization of ethylene and higher alpha-olefins and allows the synthesis of ethylene polymers and copolymers with a relatively narrow molecular weight distribution and homogeneous branching distribution. The catalyst of the invention exhibits high activity for copolymerization of ethylene and higher alpha-olefins and allows the synthesis of linear low density polyethylene with a relatively narrow molecular weight distribution and homogeneous branching distribution. The molecular weight distribution is determined as MFR $[I_{21}/I_2]$ which is less than 25, preferably the MFR ranges from 15 to 25, and most preferably ranges from 17 to 23, in polymerization products of the invention. Branching distribution in ethylene copolymers is evaluated on the basis of the resin's melting point. Relatively homogeneous branching distribution is one which the melting point ranges from 100° to 120° C., depending on comonomer composition.

Ethylene polymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/propylene/diene copolymers.

Ethylene/1-butene and ethylene/1-hexene copolymers are the most preferred copolymers polymerized in the process of and with the catalyst of this invention. The ethylene copolymers produced in accordance with the present invention preferably contain at least about 60 percent by weight of ethylene units.

Any heretofore known alpha-olefin polymerization processes can be used to polymerize alpha-olefins in the presence of the catalyst compositions of the present invention. Such processes include polymerizations carried out in suspensions, in solution or in the gas phase. However, gas phase polymerizations are preferred, e.g., in stirred bed reactors, and especially fluidized bed reactors.

Hydrogen may be used as a chain transfer agent in the polymerization reaction of the present invention. The ratio of hydrogen/ethylene employed will vary between about 0 to about 0.1 moles of hydrogen per mole of ethylene in the gas phase. Any gas inert to the catalyst and reactants can also be present in the gas stream.

When undertaken in the gas phase fluid bed reactor, the process is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a point above the distribution plate at a rate equal to its consumption. Injection into the bed aids in distributing the catalyst throughout the bed and precludes the formation of localized spots of high catalyst concentration.

The production rate of polymer in the bed is controlled by the rate of catalyst injection. Since any change in the rate of catalyst injection changes the rate of generation of the heat of reaction, the temperature of the recycle gas is adjusted to accommodate the change in rate of heat generation. The recycle gas is passed through a heat exchanger which controls the bed temperature. More heat is removed as the reaction rate increases. A compressor is located between the heat exchanger and reactor and acts to fluidize the bed and provide movement to remove heat.

Since the rate of heat generation is directly related to product formation, a measurement of the temperature rise of the gas across the reactor (the difference between inlet gas temperature and exit gas temperature) is determinative of the rate of particulate polymer formation at a constant gas velocity.

Under a given set of operating conditions, the fluidized bed is maintained at essentially a constant height by withdrawing a portion of the bed as product at a rate equal to the rate of formation of the particulate polymer product.

It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

EXAMPLES

General. All manipulations were performed using standard Schlenk techniques under $N_2$ or in a Braun inert atmosphere box under $N_2$, prescrubbed and continuously circulated through a purifier. All catalysts described are air and moisture sensitive. $C_6F_5Br$, $(C_6H_5)_3CCl$, $Me_3SiNMe_2$, and 1.0M $BCl_3$ in heptane were purchased from Aldrich and used as received. Anhydrous THF and toluene in sealed containers were purchased from Aldrich and used as received. Methyllithium and n-butyllithium were purchased as 1.6M solutions in diethyl ether from Fluka and used as received. PQ 988 and Davison 955 silicas were calcined in dry air prior to use. PST/DVB beads were purchased from Advanced Polymer Systems and degassed under vacuum at 100° C. before use. $B(C_6F_5)_3$ was purchased from AKZO and used as received. Thirty weight percent methylaluminoxane in toluene and $Ind_2ZrCl_2$ were purchased from Schering/Witco and used as received. Heptane, 1-hexene, and ethylene were purified over molecular sieves and copper oxide catalyst prior to use. $Ind_2ZrMe_2$ was prepared by the method of Samuel and Rausch *J. Amer. Chem. Soc.* 1973, 95, 6263.

$Ph_3C^+B(C_6F_5)_4^-$ was prepared by a modification of the literature procedure reported in Chien et al. It was produced in one pot by the following series of reactions:

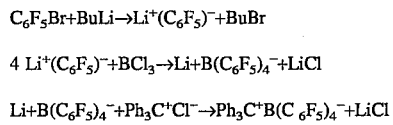

The compound was generated and filtered onto a mixture of zirconium compound and support without isolation.

Passivation of PQ 988-600 silica. A 250 mL round bottom flask containing a magnetic stir bar was charged with 5.0 gm PQ 988 $SiO_2$ calcined at 600° C. and 100 mL heptane. 7.5 mmol of passivation agent ($Me_3SiNMe_2$, n-BuLi, MeLi, $Me_3Al$, i-$Bu_3Al$, MAO or TMA/MAO) were added and the slurry stirred for 15 minutes at room temperature. The heptane was removed in vacuo at 60°–70° C. to leave white, free-flowing silica.

Passivation of PST/DVB. A 250 mL round bottom flask containing a magnetic stir bar was charged with 5.0 gm PST/DVB and 100 mL heptane. 10.0 mmol of passivation agent ($Me_3Al$, i-$Bu_3Al$, or $Bu_2Mg$) were added and the slurry stirred for 15 minutes at room temperature. The heptane was removed in vacuo at 60°–70° C. to leave white, free-flowing polystyrene.

Differential scanning calorimetry were recorded on DuPont 9900 or TA 2200 thermal analyzers. IR spectra were recorded by a Perkin Elmer 1600 FTIR. Melt index were determined by Kayness melt indexers. Density was determined using density gradient columns.

EXAMPLE 1

$Ph_3C^+B(C_6F_5)_4^-$ and $Ind_2ZrCl_2$ on support

Catalyst A. A 250 mL round bottom flask containing a magnetic stir bar and 100 mL toluene was cooled to –78° C. and charged with 0.16 mL (1.3 mmol) $C_6F_5Br$. A solution of 0.81 mL (1.3 mmol) 1.6M n-BuLi in hexane was added followed by 15 minutes of stirring. The resulting white slurry was treated with 0.33 mL (0.33 mmol) 1.0M $BCl_3$ in heptane. The resulting clear solution was stirred for 45 minutes at –78° C. followed by 1.5 hours at room temperature. 91 mg (0.33 mmol) $Ph_3CCl$ were then added and the resulting orange solution which contained fine solids was stirred at room temperature for 1 hour. (Theoretical yield: 302 mg, 0.33 mmol $Ph_3C^+B(C_6F_5)_4^-$).

The orange solution was filtered through a celite plug onto a dry mixture of 5.0 gm of support and 50 mg (0.13 mmol) $Ind_2ZrCl_2$. The resulting slurry was stirred at room temperature for 15 minutes and the toluene removed in vacuo at 60°–70° C. to leave yellow, free-flowing catalyst powder.

Catalysts B–H with other zirconium loadings were prepared by the same procedure.

| Catalyst | Loading mmol/g | Support |
|---|---|---|
| A | 0.10 | PST/DVB |

-continued

| Catalyst | Loading mmol/g | Support |
|---|---|---|
| B | 0.05 | untreated 988-600 $SiO_2$ |
| C | 0.025 | 988-600 $SiO_2$/TMA |
| D | 0.05 | 988-600 $SiO_2$/TIBA |
| E | 0.10 | 988-600 $SiO_2$/Me$_3$Si |
| F | 0.10 | 988-600 $SiO_2$/BuLi |
| G | 0.10 | 988-600 $SiO_2$/MAO |
| H | 0.10 | 988-600 $SiO_2$/TMA/MAO |

In slurry evaluation, the PST/DVB supported $Ind_2ZrCl_2$ and $Ph_3C^+B(C_6F_5)_4^-$ catalyst the highest activity, followed by TMA treated silica. Polymers produced with these catalysts showed the low melting points and low MFRs characteristic of single site metallocene catalysts as shown below.

minutes at $-78°$ C. followed by 1.5 hours at room temperature. 140 mg (0.50 mmol) $Ph_3CCl$ were then added and the resulting orange solution which contained fine solids was stirred at room temperature for 1 hour. (Theoretical yield: 461 mg, 0.50 mmol $Ph_3C^+B(C_6F_5)_4^-$).

The orange solution was filtered through a celite plug onto a dry mixture of 5.0 gm of support and 176 mg (0.50 mmol) $Ind_2ZrMe_2$. The resulting orange slurry was stirred at room temperature for 15 minutes and the toluene removed in vacuo at 60°–70° C. to leave yellow, free-flowing catalyst powder.

| Catalyst | Support |
|---|---|
| I | PST/DVB |
| J | 988-600 $SiO_2$/Me$_3$Si |

| | Catalyst | | | | | | | |
|---|---|---|---|---|---|---|---|---|
| | A | B | C | D | E | F | G | H |
| | | | | | Support | | | |
| | PST/DVB | untreated $SiO_2$ | TMA on $SiO_2$ | TIBA on $SiO_2$ | Me$_3$Si on $SiO_2$ | BuLi on $SiO_2$ | MAO on $SiO_2$ | MAO/TMA on $SiO_2$ |
| Productivity g/g cat/hr/100 psi | 2800 | 26 | 440 | 22 | 880 | 36 | 77 | 36 |
| mmol Zr/g cat | 0.10 | 0.05 | 0.025 | 0.05 | 0.10 | 0.10 | 0.10 | 0.10 |
| Activity kg/g Zr/hr/100 psi | 310 | 6 | 190 | 5 | 97 | 4 | 8 | 4 |
| $I_2$ | 0.36 | 0 | 0.42 | | 0.10 | 0.16 | 0.21 | 0.10 |
| MFR | 22.0 | | 24.8 | | 21.8 | 21.6 | 51 | 31 |
| Tm °C. | 110 | | 112, 119 | | 115 | 112, 124 | 111 | 116 |
| Density | 0.913 | | 0.916 | | 0.914 | 0.928 | 0.923 | 0.928 |
| Mole % $C_6$ | 2.9 | 1.9 | 2.9 | | 2.4 | 2.5 | 3.0 | 2.5 |

(Reactor Temp. = 70° C., TIBA Cocatalyst)

EXAMPLE II $Ph_3C^+B(C_6F_5)_4^-$ and $Ind_2ZrMe_2$ on support

Catalyst I. A 250 mL round bottom flask containing a magnetic stir bar and 100 mL toluene was cooled to $-78°$ C. and charged with 0.25 mL (2.0 mmol) $C_6F_5Br$. A solution of 1.25 mL (2.0 mmol) 1.6M n-BuLi in hexane was added followed by 15 minutes of stirring. The resulting white slurry was treated with 0.50 mL (0.50 mmol) 1.0M $BCl_3$ in heptane. The resulting clear solution was stirred for 45

-continued

| Catalyst | Support |
|---|---|
| K | PST/DVB/TIBA |
| L | PST/DVB/TNOA |
| M | PST/DVB/Bu$_2$Mg |

$Ind_2ZrR_2$ and $Ph_3C^+B(C_6F_5)_4^-$ were directly impregnated onto support. The effect of support on this catalyst in slurry evaluation are shown below.

| | Catalyst | | | | |
|---|---|---|---|---|---|
| | I | J | K | L | M |
| | | | Support | | |
| | untreated PST/DVB | Me$_3$Si on $SiO_2$ | TIBA on PST/DVB | TNOA on PST/DVB | Bu$_2$Mg on PST/DVB |
| Productivity g/g cat/hr/100 psi | 630 | 1 | 210 | 120 | 29 |
| $I_2$ | 0.10 | | 0.09 | 0.26 | 0.11 |
| MFR | 20.1 | | 21.1 | 36.4 | 27.7 |
| Tm °C. | 117 | | 113, 118 | 115, 123 | 120 |
| Density | 0.915 | | 0.916 | 0.922 | 0.930 |
| Mole % $C_6$ | 2.2 | | 2.3 | 2.4 | 1.3 |

(Reactor Temp. = 70° C., TIBA cocatalyst, 0.1 mmol Zr/gm loading, 1:1 B/Zr)

Silica supported catalyst was dead. Untreated PST/DVB was the only viable support tested for this catalyst system.

EXAMPLE III $B(C_6F_5)_3$ and $Ind_2ZrMe_2$ on support

Catalyst N. A 250 mL round bottom flask containing a magnetic stir bar was charged with 510 mg (1.0 mmol) $B(C_6F_5)_3$, 350 mg (1.0 mmol) $Ind_2ZrMe_2$, and 5.0 gm of support. 100 mL heptane were added and the resulting yellow slurry was stirred at room temperature for 15 minutes. The heptane was removed in vacuo at 60°–70° C. to leave free-flowing catalyst powder. Catalyst color depended on the support and usually darkened considerably upon standing in the drybox.

| Catalyst | Support | Color |
|---|---|---|
| N | PST/DVB | peach |
| O | 955-200 $SiO_2$ | orange |
| P | untreated 988-600 $SiO_2$ | dark orange |
| Q | 988-600 $SiO_2$/TMA | orange-red |
| R | 988-600 $SiO_2$/TIBA | dirty yellow |
| S | 988-600 $SiO_2$/$Me_3Si$ | yellow-orange |
| T | 988-600 $SiO_2$/BuLi | orange-red |

Supported $Ind_2ZrMe_2$ and $B(C_6F_5)_3$ catalyst was approximately five times more active in slurry evaluation than the trityl based system. Unexpectedly, the borane system remained very active when supported on silica as shown below.

|  | Catalyst | | | | | | |
|---|---|---|---|---|---|---|---|
|  | N | O | P | Q | R | S | T |
|  | | | | Support | | | |
|  | PST/DVB | 955-200 $SiO_2$ | 988-600 $SiO_2$ | TMA/ 988-600 | TIBA/ 988-600 | $Me_3Si$/ 988-600 | BuLi/ 988-600 |
| Productivity g/g cat/hr/ 100 psi | 4700 | 4500 | 3400 | 8900 | 1100 | 9800 | 4600 |
| MI | 0.16 | 0.20 | 0.17 | 0.26 | 0.04 | 0.31 | 0.12 |
| MFR | 26.0 | 24.1 | 20.9 | 24.1 | 22.3 | 24.3 | 22.6 |
| Tm °C. | 115 | 114 | 113 | 116 | 116 | 113 | 114 |
| Density, g/cc | 0.913 | 0.912 | 0.912 | 0.910 | 0.912 | 0.905 | 0.910 |
| % $C_6$ | 3.0 | 3.2 | 3.2 | 3.2 | 2.8 | 4.5 | 3.0 |

(Reactor Temp. = 70° C., TIBA Cocatalyst, 0.2 mmol Zr/gm loading, 1:1 B/Zr)

EXAMPLE IV

General Slurry Polymerization Procedure

A 1 gallon stainless steel autoclave at room temperature was charged with 1500 mL heptane and 350 mL 1-hexene. Alkylaluminum in hexane was added. The reactor was closed, and the temperature was brought to operating temperature. Catalyst was added to the reactor with ethylene pressure. Ethylene was replenished on demand to keep reactor pressure constant at 135 psi. After 60 minutes, the reactor was vented and cooled to room temperature. The polymer was collected and dried.

EXAMPLE V

Gas Phase Polymerization Using Catalyst I

A gas phase reactor was tested for leaks at low and high pressure. Resin that had been vacuum dried was loaded. This seedbed was purged four times with ethylene from 0 psig to 200 psig. On the last ethylene purge, a moisture reading was taken to ensure that there was less than 20 ppm water in the reactor.

The reactor was charged with 120 psi of nitrogen, tri-isobutylaluminum, 140 psi of ethylene, and no hydrogen. Reactor temperature was targeted to 75° C. A hexene feed was established. Catalyst feed was started when the hexene/ethylene gas ratio was greater than 0.010.

Ethylene partial was controlled with the catalyst feed while reactor pressure was maintained with the vent rate. The hexene gas ratio was achieved by varying the hexene feed rate.

A supported zirconocene/MAO catalyst was fed at a rate of approximately 0.5 grams/hr and maintained a production rate of 3.0 lbs/hr. 90 lbs of resin were produced under the following process conditions:

Bed Temp=75° C.
No hydrogen
TIBA concentration=300 ppm
Reactor Pressure=300–330 psia
Ethylene partial pressure=140 psia
$C_6/C_2$ gas ratio=0.010
Recycle rate=1.5 klb/hr
Productivity=2500 lb-resin/lb-catalyst The supported Zr/MAO catalyst was replaced in the catalyst feeder by catalyst I. Catalyst feed rate and vent rate were increased to maintain ethylene partial pressure and reactor pressure. An ethylene partial pressure of 155–165 psia was targeted.

From catalyst feeder estimations, the catalyst I had approximately 50% lower activity than the supported zirconocene/MAO catalyst. A 2.5 lb/hr production rate with the catalyst I was maintained at the following process conditions:

Bed Temp=75° C.
No hydrogen
TIBA concentration=300 ppm
Reactor Pressure=300–330 psia
Ethylene partial pressure=155 psia
$C_6/C_2$ gas ratio=0.014
Recycle rate=1.5 klb/hr
Productivity=1000–1500 lb-resin/lb-catalyst Resin produced by the two catalysts are compared below:

|  | Catalyst | |
|---|---|---|
|  | ZR/MAO | I |
| MI, g/10 min | 7.4 | 4.0 |
| MFR | 18.1 | 19 |
| Density, g/cc | 0.919 | 0.922 |
| Settled Bulk Density, lbs/ft$^3$ | 28.9 | 28.1 |

The supported $Ind_2ZrMe_2/Ph_3C^+$ catalyst made a higher molecular weight polymer than the supported zirconocene/MAO catalyst.

EXAMPLE VI

Gas Phase Polymerization Using Catalyst N

A gas phase reactor was tested for leaks at low and high pressure. Resin that had been vacuum dried was loaded. This seedbed was purged four times with ethylene from 0 psig to 200 psig. On the last ethylene purge, a moisture reading was taken to ensure that there was less than 20 ppm water in the reactor.

The reactor was charged with 120 psi of nitrogen, triisobutylaluminum, 140 psi of ethylene, and no hydrogen. Reactor temperature was targeted to 75° C. A hexene feed was established. Catalyst feed was started when the hexene/ethylene gas ratio was greater than 0.010.

Ethylene partial was controlled with the catalyst feed while reactor pressure was maintained with the vent rate. The hexene gas ratio was achieved by varying the hexene feed rate. After approximately 1 bed turnover, a TIBA cofeed of approximately 500 ppm was begun. Catalyst was fed at 0.6 grams/hr and a 2.5–3.0 lb/hr production rate was maintained under the following reactor conditions:

Bed Temp=75° C.

No hydrogen

TIBA concentration=500–1000 ppm

Reactor Pressure=300–330 psia

Ethylene partial pressure=180 psia $C_6/C_2$ gas ratio=0.026

Recycle rate=1.5 klb/hr

Productivity=2000–2500 lb-resin/lb-catalyst

After eight BTOs, the cationic catalyst produced resin with the following characteristics:

|  | Catalyst N |
|---|---|
| MI, g/10 min | 2.5 |
| MFR | 22 |
| Density, g/cc | 0.922 |
| Settled Bulk Density, lbs/ft$^3$ | 28 |

Catalyst N produced higher molecular weight resin and was more active than catalyst I in the gas phase.

Thus it is apparent that there has been provided, in accordance with the invention, a catalyst that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst comprising particles of a crosslinked polymer, having an average particle diameter of about 1 to about 300 microns, a porosity of about 0.001 to about 10 cc/gm, and a surface area of about 1 to about 1,000 m$^2$/gm, and a metallocene having an empirical formula $$Cp_mMAB;$$

wherein Cp comprises a cyclopentadienyl group, M is zirconium or hafnium; m is 1, 2, or 3 and each of A and B is an anion of boron, hydrogen or an alkyl group, wherein at least one of A or B is a borate anion and wherein the molar ratio of M:boron is 1:1.

2. The catalyst of claim 1, wherein the metallocene is supported on said particles and formed in the presence of said particles, wherein the loading of metallocene to said particles ranges from 0.01 to 2.0 mmol/g.

3. The catalyst of claim 1, wherein the particle diameter is 10 to about 150 microns.

4. The catalyst of claim 1, wherein the particle diameter is about 10 to about 110 microns.

5. The catalyst of claim 1, wherein the anion is a tetraarylborane.

6. The catalyst of claim 5, wherein the aryl of said tetraarylborane comprises phenyl.

7. The catalyst of claim 5, wherein the aryl of said tetraarylborane comprises perfluorophenyl.

8. The catalyst of claim 7, wherein Cp is indenyl and M is zirconium.

9. The catalyst of claim 7, which is free of aluminoxane.

10. The catalyst of claim 1, wherein the crosslinked polymer is formed with a crosslinking agent selected from the group consisting of divinylbenzene, paravinylstyrene, paramethylstyrene, and trimethylacrylate.

11. The catalyst of claim 1, wherein the crosslinked polymer is formed with the crosslinking agent divinylbenzene.

12. The catalyst of claim 11, wherein the polymer is formed from styrene.

13. The catalyst of claim 1, wherein the polymer is formed from styrene.

14. A catalyst comprising particles of a crosslinked polymer, having a particle diameter of about 1 to about 300 microns, a porosity of about 0.001 to about 10 cc/gm, and a surface area of about 1 to about 1,000 m$^2$/gm, and a metallocene having an empirical formula $$Cp_mMAB$$

in which Cp comprises a cyclopentadienyl group, M is zirconium or hafnium; m is 1, 2, or 3 and each of A and B is selected from the group consisting of borate anion, halide and alkoxide, and wherein at least one of A or B is a borate anion, wherein the molar ratio of M:boron ranges from 1:1 to 2:1; wherein the metallocene is supported on said particles and formed in the presence of said particles, wherein the mole loading of metallocene to said particles ranges from 0.01 to 2.0 mmol/g; wherein the catalyst is activated with trialkylaluminum.

15. The catalyst of claim 14 wherein trialkylaluminum is present in an amount sufficient to provide a M:Al mole ratio of 3:1 to 300:1.

16. The catalyst of claim 15, wherein the trialkylaluminum is triisobutylaluminum.

17. The catalyst of claim 16, wherein the particle diameter is 10 to about 150 microns.

18. The catalyst of claim 16, wherein the particle diameter is about 10 to about 110 microns.

19. The catalyst of claim 16, wherein the anion is a tetraarylborane.

20. The catalyst of claim 19, wherein the aryl of said tetraarylborane comprises phenyl.

21. The catalyst of claim 19, wherein the aryl of said tetraarylborane comprises perfluorophenyl.

22. The catalyst of claim 21, wherein Cp is indenyl and M is zirconium.

23. The catalyst of claim 14, wherein the crosslinked polymer is formed with a crosslinking agent selected from the group consisting of divinylbenzene, paravinylstyrene, paramethylstyrene, and trimethylacrylate.

24. The catalyst of claim 14, wherein the crosslinked polymer is formed with the crosslinking agent divinylbenzene.

25. The catalyst of claim 24, wherein the polymer is formed from styrene.

26. The catalyst of claim 14, wherein the polymer is formed from styrene.

27. A process for forming a catalyst comprising particles of a crosslinked polymer, having an average particle diameter of about 1 to about 300 microns, a porosity of about 0.001 to about 10 cc/gm, and a surface area of about 1 to about 1,000 m$^2$/gm, and a metallocene having an empirical formula $Cp_m MAB$;

wherein Cp comprises a cyclopentadienyl group, M is zirconium or hafnium; m is 1, 2, or 3 and each of A and B is an anion of boron, hydrogen or an alkyl group, wherein at least one of A or B is a borate anion and wherein the molar ratio of M:boron is 1:1, wherein the process comprises (i) slurrying said particles in a solution comprising a trityl borate anion having an empirical formula $(C_6H_5)_3{}^{C+}(B\{Ar\}_4)^-$ or a boron of the formula $B(Ar)_3$ wherein Ar is fluoride substituted phenyl, to form a step (i) intermediate in said slurry, wherein the step (i) intermediate contains a weight ratio of boron to said particles of 1:1 to 2:1;

(ii) reacting the step (i) intermediate with $Cp_2 MX_2$ wherein X is a halogen atom, hydrogen or an alkyl group, wherein Cp comprises a cyclopentadienyl group, and (iii) removing the solvent and isolating a free flowing powder.

28. The process of claim 27, wherein the solution is orange and the free flowing powder is yellow.

29. The process of claim 27, wherein the crosslinked polymer is formed with a crosslinking agent selected from the group consisting of divinylbenzene, paravinylstyrene, paramethylstyrene, and trimethylacrylate.

30. The process of claim 27, wherein the crosslinked polymer is formed with the crosslinking agent divinylbenzene.

31. The process of claim 30, wherein the polymer is formed from styrene.

32. The process of claim 27, wherein the polymer is formed from styrene.

33. A process for forming a catalyst precursor comprising impregnating particles of a crosslinked polymer, having a particle diameter of about 1 to about 300 microns, a porosity of about 0.001 to about 10 cc/gm, and a surface area of about 1 to about 1000 m$^2$/gm with a mixture comprising either a trityl borate anion of the formula $(C_6H_5)C^+(B\{Ar\}_4)^-$ or a borane of the formula $B(Ar)_3$ and a metallocene of the empirical formula $Cp_m MAB$ in which Cp comprises a cyclopentadienyl group,
M is zirconium or hafnium;
m is 1, 2, or 3 and
each of A and B is selected from the group consisting of halogen atom, hydrogen or alkyl wherein Ar comprises phenyl or perfluorophenyl.

34. The process of claim 33, wherein the crosslinked polymer is formed with a crosslinking agent selected from the group consisting of divinylbenzene, paravinylstyrene, paramethylstyrene, and trimethylacrylate.

35. The process of claim 33, wherein the crosslinked polymer is formed with the crosslinking agent divinylbenzene.

36. The process of claim 35, wherein the crosslinked polymer is formed from styrene.

37. The process of claim 33, wherein the crosslinked polymer is formed from styrene.

38. A process for olefin polymerization to produce polymers of ethylene which exhibit a molecular weight distribution expressed as MFR (HLMI/$I_{21}$) of less than 24, comprising contacting a feed comprising ethylene with a catalyst comprising particles of a crosslinked polymer having an average particle diameter of about 1 to about 300 microns, a porosity of about 0.001 to about 10 cc/gm, and a surface area of about 1 to about 1,000 m$^2$/gm, and a metallocene having an empirical formula $Cp_m MAB$;

wherein Cp comprises a cyclopentadienyl group, M is zirconium or hafnium; m is 1, 2, or 3 and each of A and B is a tetraarylborane wherein the aryl of said tetraarylborane comprises perfluorophenyl, hydrogen, or an alkyl group, wherein at least one of A or B is a tetraarylborane wherein the aryl of said tetraarylborane comprises perfluorophenyl and wherein the molar ratio of M:boron is 1:1.

39. The process of claim 38, wherein the crosslinked polymer is formed of styrene.

40. The process of claim 39, wherein the crosslinked polymer is formed with a crosslinking agent selected from the group consisting of divinylbenzene, paravinylstyrene, paramethylstyrene, and trimethylacrylate.

* * * * *